US006229437B1

United States Patent
Schmid et al.

(10) Patent No.: US 6,229,437 B1
(45) Date of Patent: May 8, 2001

(54) DEVICE FOR CONTROLLING A MOTOR VEHICLE OCCUPANT PROTECTION SYSTEM

(75) Inventors: Gerhard Schmid, Regensburg; Walter Baumgartner, Zeitlarn; Michael Köppl, Sinzing; Stefan Hermann, Köfering, all of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/149,857

(22) Filed: Sep. 8, 1998

Related U.S. Application Data

(63) Continuation of application No. PCT/DE97/00449, filed on Mar. 7, 1997.

(30) Foreign Application Priority Data

Mar. 8, 1996 (DE) ...................................... 196 079

(51) Int. Cl.⁷ ...................................................... B60Q 1/00
(52) U.S. Cl. ........................ 340/438; 340/440; 180/282; 280/728.1; 280/735; 280/753; 701/45
(58) Field of Search .................................... 340/438, 440, 340/457.1; 180/282; 280/728.1, 735, 753; 701/45

(56) References Cited

U.S. PATENT DOCUMENTS 4,359,715   11/1982   Langer et al. .................... 340/438

5,309,436   5/1994   Hirano et al. .................... 340/438

FOREIGN PATENT DOCUMENTS

| 3233570A1 | 12/1982 | (DE) . |
| 9317678 | 4/1995 | (DE) . |
| 0471871A1 | 2/1992 | (EP) . |
| 0507581A1 | 10/1992 | (EP) . |
| 0531989A1 | 3/1993 | (EP) . |
| 0693401A2 | 1/1996 | (EP) . |

OTHER PUBLICATIONS

Published International Application No. 88/05390 (Drobny et al.), dated Jul. 28, 1988.

Published International Application No. 89/09146 (Nitschke et al.), dated Oct. 5, 1989.

*Primary Examiner*—Daryl Pope
(74) *Attorney, Agent, or Firm*—Herbert L. Lerner; Laurence A. Greenberg; Werner H. Stemer

(57) ABSTRACT

A device for controlling a motor vehicle occupant protection system. Such a device has a control unit with an encoder for encoding messages and a transmitter for transmitting the encoded messages in the form of output signals. The encoded messages include a first encoded message having a first number of positions and a second encoded message having a second number of positions, the first number of positions being smaller than the second number of positions. In this case, at least one of the encoded messages may be provided with an error-correction code.

15 Claims, 2 Drawing Sheets

CN1: m=1 ... 16
| 0 | 0 | 0 0 0 0 0 0 | 1 1 1 1 | 1 1 1 1 |
s=1, 2 | i=1 ... i=6 | s=3 ... s=10
ST | IN | ST

CN2: m=1 ... 24
| 0 0 | 0 0 0 1 1 1 | 1 1 0 0 | 1 1 1 1 1 1 | 1 1 1 1 1 1 |
s=1,2 | i=1 ... 6 | s=3 ... 6 | i=7 ... i=12 | s=7 ... s=12
ST | IN | ST | IN | ST

DEVICE FOR CONTROLLING A MOTOR VEHICLE OCCUPANT PROTECTION SYSTEM

CROSS-REFERENCE TO RELATED APPLICATION

This is a continuation of copending International Application CT/DE97/00449, filed Mar. 7, 1997, which designated the United States.

BACKGROUND OF THE INVENTION

Field of the Invention

The invention relates to a device for controlling a motor vehicle occupant protection system. The device includes a control unit having an encoder outputting encoded messages and a transmitter for transmitting the encoded messages as output signals.

Such a device is disposed separately, i.e. for example in a side part of the motor vehicle and is described in European Patent Application EP 0 693 401 A2. The known device includes an acceleration sensor and a control unit with an encoder for encoding messages and a transmitter for transmitting the encoded messages in the form of signals. The messages to be transmitted are transmitted in pulse-width-modulated form to an evaluation device disposed centrally within the vehicle. Such a message may for example have the content: "The occupant protection system is to be triggered, because the recorded acceleration has exceeded a predetermined threshold value". Occupant protection system ignition elements connected to the evaluation device, such as, for example, lateral airbags, belt tighteners, head airbags or the like are acted upon with energy, due to an encoded message being transmitted without error, so that the associated occupant protection systems are activated. In order to recognize a defective transmission between a separate device and the central evaluation device, the duration of the period of the transmitted signals is compared with a theoretical period duration in the evaluation device. If the measured period duration and theoretical period duration are not concordant, the transmitted message is discarded. A defective transmission can be caused, in particular by electromagnetic fields acting on the data line.

Since a signal representing that a message has been sent by the separate device is periodically sent to the central evaluation device, a defective signal is at least prevented from being permanently ignored. However, if the signals transmitted subsequently to a defective signal are also defective then, specifically in the case of signals that have triggering instructions as their content, valuable time is wasted for triggering the occupant protection system. In particular, the triggering of an occupant protection system for side-impact protection can subsequently take place too late and cause injuries to the occupant. Because the time required for the triggering of occupant protection systems for side-impact protection are set extremely short, within 5 msec from the commencement of side impact, the triggering decision should be made, since there is no crumple zone protecting the occupant. The triggering time cannot be obtained in time when several defective signals are transmitted one after the other.

SUMMARY OF THE INVENTION

It is accordingly an object of the invention to provide a device for controlling a motor vehicle occupant protection system which overcomes the herein afore-mentioned disadvantages of the heretofore-known devices of this general type, which transmits data relevant to a triggering of an occupant protection system and enables a secure transmission of messages to a remotely disposed control unit in the motor vehicle within a very short time.

With the foregoing and other objects in view there is provided, in accordance with the invention, in a motor vehicle occupant protection system, an apparatus for controlling a motor vehicle occupant protection device, the apparatus including: a control unit having an encoder for encoding messages and a transmitter connected to the encoder for transmitting encoded messages as output signals; and the encoded messages include a first encoded message having a first number of positions and containing information relevant to safety and a second encoded message having a second number of positions greater than the first number of positions.

With the foregoing and other objects in view there is also provided, in accordance with the invention, in a motor vehicle occupant protection system, an apparatus for controlling a motor vehicle occupant protection device, the apparatus including: a control unit having an encoder for encoding messages and a transmitter connected to the encoder for transmitting encoded messages as output signals; and the encoded messages include a first encoded message containing information relevant to safety and a second encoded message, each of the encoded messages having an information word and a control word, the information word of the first encoded message having a first number of positions and the information word of the second encoded message having a second number of positions greater than the first number of positions.

With the foregoing and other objects in view there is further provided, in accordance with the invention, in a motor vehicle occupant protection system, an apparatus for controlling a motor vehicle occupant protection device, the apparatus including a control unit having an encoder for encoding messages containing information relevant to safety and a transmitter connected to the encoder for transmitting encoded messages as output signals, and the encoded messages are encoded with an error-correction code.

The inventive device is based on the concept that the transmitter of the device operates serially and files the individual symbols of the encoded messages in temporal succession onto the transmission medium, preferably a data line. In addition, individual inventive concepts come to light using parallel transmission.

According to the invention, messages with differing content/information are converted into encoded message words of differing length. In this case, the first encoded message has the first number of positions, and the second encoded message has the second number of positions, the first number being smaller than the second number. Preferably, in this case messages which require or suggest a triggering of the associated occupant protection system contain in encoded form a smaller number of positions than messages which exhibit, for example, information independent of acceleration. As a result of the small number of positions of an encoded message containing, for example, a triggering instruction, the same can be transmitted serially in an extremely short time and, moreover, can be evaluated extremely quickly in the control device receiving the message, so that the corresponding measures can be introduced immediately. Messages of less urgent content may have, in encoded form, a substantially larger number of positions and thus a larger word length. The inventive device also reveals advantages in particular in circumstances in which there are provided a large number of different messages which, in the presence of conventional encoding with the same number of positions for all messages, would require a large number of positions.

An encoded message may include not only an information word which contains the sense content of the message in encoded form, but also a control word which controls the transmission of the encoded message. In particular in the case of asynchronous data transmission but also in the case of synchronous data transmission, the control word is necessary over and above the information word. As a rule, it has a position which precedes the information word and which is occupied by a start signal which characterizes the start of a following information word. Following the information word, there is usually a further position which is associated with the control word of the encoded message and which has a stop symbol, which characterizes the end of a transmitted information word. It is essential in the case of a device which generates messages encoded in this fashion that at least the information word has, dependent on the content of a message, differing lengths. In this case, if appropriate, the message length of the different messages (i.e. the total number of positions which can be occupied by symbols) may be the same, even if the one encoded message enjoys higher priority and its information word has only a few positions and the other message has a low priority and its information word includes many positions. The encoded message having the information word configured to be short may, instead, include a control word configured to be longer. In this case, the control word preferably includes a plurality of, i.e. at least two, positions intended for stop symbols. In this case, the start symbol for the next encoded message is also not correctly recognized, so that, on a permanent basis, there is a false synchronization between the transmitter and the receiver. For this reason, in particular, the encoded message has a short information word and a longer control word with a plurality of stop symbols. If the start symbol is not correctly recognized, a symbol of the following information word will probably be interpreted as the start symbol. As a result of the large number of stop symbols, it is guaranteed that, even in this case, the stop symbol follows the "right-shifted" erroneously interpreted information word, so that the synchronization between transmitter and receiver is again created and the start symbol of the following encoded message is recognized as such. The advantages of the device reside in the number of positions of the information word, and not in the number of positions of the control word. The number of positions of the information word is of decisive importance for the rapid transmission and evaluation of the message.

According to the invention, the message to be transmitted is encoded with an error-correction code. Such an error-correction code has the property that at least a defective symbol of the encoded message can be recognized by the receiving device and corrected.

In the case of an illustrative error-correction code, one individual symbol of a message is imaged onto a plurality of symbols to be transmitted. Thus in the transmitter, by way of example in the case of binary encoding, the symbol 0 is imaged onto three successive zeros. The receiving device forms a majority decision for the three received symbols. If, accordingly, at least two zeros of the three zeros dispatched are received, then a zero is interpreted as the symbol actually to be transmitted. The number of positions which is to be made available for a data transmission with error-correction code, also referred to as the Hamming distance, is computed on the basis of $2 \cdot n+1$ with n as the number of positions of the symbols/positions of the original code word which are to be provided with an error-correction code.

As a result of the use of the error-correction code in the formulation of messages of the device for controlling an occupant protection system, there is a considerable reduction in the probability of a loss of time occurring through discarding a defective encoded message by the receiving device. The probability of a double or multiple error in an encoded message, which, even in the case of the use of an error-correction code, would lead to a message possibly erroneously interpreted by the receiving device or to a message to be discarded is substantially lower than the probability of a single error. As a result of the application of the error-correction code to data transmission paths in systems for controlling occupant protection systems, the susceptibility of the entire system to interference is reduced and at the same time a triggering of the occupant protection systems which is temporally correct and, in particular in the event of side-impact recognition, is timely achieved, since, in comparison with multiple code word transmission, which is necessary in the case of code words encoded only with an error-recognition code and an error in each code word, a time gain can be achieved.

According to the invention, the messages for an occupant protection system can accordingly be encoded with a variable code length and/or an error-correction code independently of one another or, advantageously, combined with one another.

In accordance with an added feature of the invention, the encoded messages include two identical information words.

In accordance with an additional feature of the invention, at least one of the messages is encoded as an information word with the first number of positions loaded with the error-correction code and the second number of positions loaded without the error-correction code.

In accordance with another feature of the invention, the first encoded message is encoded with the error-correction code, and the second encoded message is encoded in part with and in part without the error-correction code.

In accordance with a further added feature of the invention, the control word has at least two positions provided for a start symbol, the start symbol indicating a commencement of the information word.

In accordance with a further additional feature of the invention, the control word has at least one reserve position to be occupied by a symbol and ascribed to the information word.

In accordance with yet another feature of the invention, the control word has at least two further positions provided for a stop symbol, the stop symbol indicating an end of the information word.

In accordance with yet another added feature of the invention, the first encoded message contains information having a higher priority classification, and the second encoded message containing information having a lower priority classification.

In accordance with yet another additional feature of the invention, the first encoded message contains information appertaining to an indirect or direct triggering of an occupant protection system, and the second encoded message containing device condition information.

With the foregoing and other objects in view there is lastly provided, in accordance with the invention, a configuration for controlling a motor vehicle occupant protection system, including a control unit having: an acceleration sensor for recording an acceleration of a motor vehicle and outputting an acceleration signal; an encoder receiving the acceleration signal for encoding messages; a transmitter connected to the encoder for transmitting encoded messages as output signals, the encoded messages including acceleration-dependent signals; and an evaluation device disposed spatially separated from the control unit for controlling an occupant protection system, the evaluation device receiving and evaluating the acceleration-dependent signals from the control unit and outputting a trigger signal.

In accordance with a concomitant feature of the invention, there is an ignition device disposed spatially separated from the control unit and connected to an ignition element of the occupant protection system, the ignition device receiving the trigger signal for triggering the ignition element.

Other features which are considered as characteristic for the invention are set forth in the appended claims.

Although the invention is illustrated and described herein as embodied in a device for controlling a motor vehicle occupant protection system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
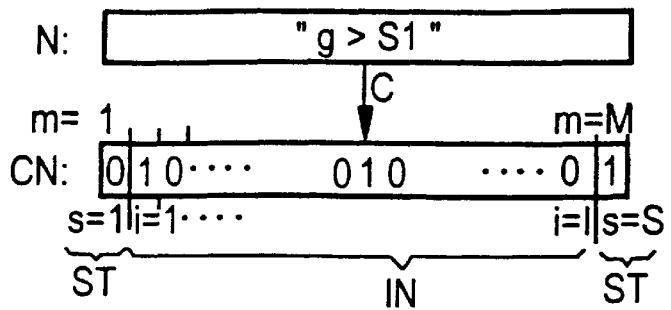
FIGS. 1 to 6 are illustrated messages, encoded messages and information words according to the invention.

Referring now to the figures of the drawing in detail and first, particularly, to FIG. 1 thereof, there is shown a symbolic message N, which is to be transmitted by a device 1 (FIG. 7) for controlling a motor vehicle occupant protection system via a suitable transmission medium, for example an electrical or optical data line, or alternatively in non-contact fashion, to a receiving device which is disposed at a spatially remote location. According to FIG. 7, the device 1 can be configured as a separate sensor unit, which includes an acceleration sensor 11 to record transverse accelerations of a vehicle and a control unit 12 having a non-illustrated evaluator, an encoder 121 and a transmitter 122. The transverse accelerations of the vehicle caused by an impact are evaluated in the evaluator. If, for example, the transverse acceleration exceeds a predetermined threshold value, the appropriate message N is to be transmitted via a data line 2 to an evaluation device 3, disposed centrally in the vehicle, as a receiving device. The corresponding message N is encoded in the encoder 121. Via the transmitter 122, the encoded message CN is output serially onto the data line 2. The evaluation device 3 is, for example, disposed at a vehicle drive shaft tunnel and includes a receiver and decoder to receive and decode the transmitted encoded messages CN. If, for example, in addition to the message containing a triggering instruction there is also information present indicating that the corresponding vehicle seat is occupied, a triggering instruction configured as an encoded message is transmitted by the evaluation device 3 via a further data line 2 to an ignition device 4. The ignition device 4 includes a receiver and decoder, so that the transmitted triggering instruction can be received and decoded. If the triggering instruction is recognized as such by the ignition device 4, then the same activates an ignition element of the associated occupant protection system.

Figures 6, 7:
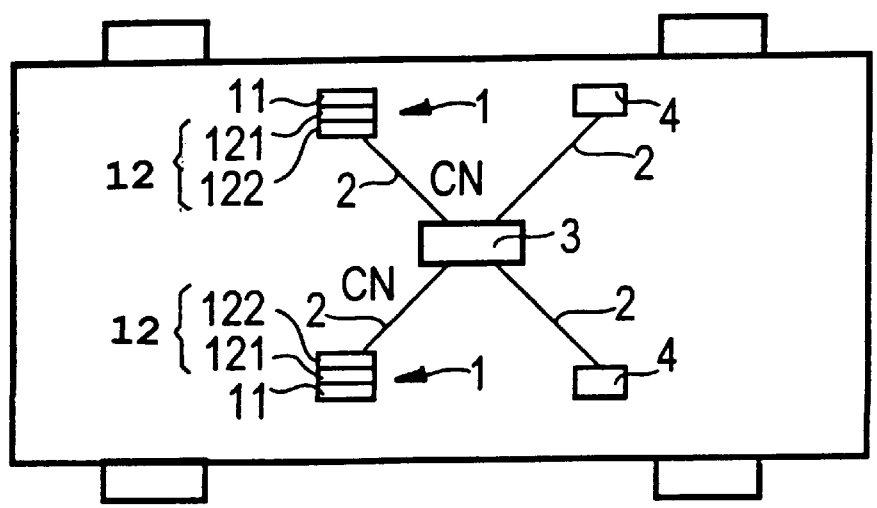
FIG. 7 is a block circuit diagram of a circuit configuration for controlling a motor vehicle occupant protection system.

According to FIG. 7, the encoding specifications proposed according to the invention can be used for the transmission of messages on the data lines 2 between separate devices 1 and the evaluation device 3 and/or between the evaluation device 3 and the ignition devices 4. In the case of the latter possibility, the evaluation device 3 is to be regarded as the device according to the invention, which includes a control unit having an encoder and a transmitter which, according to the invention, transmits edited messages to the ignition device 4. It is understood that, in those circumstances, the impact recognition is not dependent upon separate acceleration sensors, but, by way of example, an acceleration sensor is disposed, together with the evaluation device 3, within the same control unit.

Examples of messages to be transmitted from a device constructed as a separate sensor unit to a central evaluation device are:

Acceleration g has exceeded a threshold value S1 (N>S1, see FIG. 1),

Device is operational,

Device inoperative+established error.

Examples of messages to be transmitted from a device configured as the central evaluation unit to a separate ignition device are:

Execute ignition,

Device is operational,

Device defective+error code.

In the encoder of the device, such messages N are converted by an encoding specification C into encoded messages/message words (FIG. 1). An encoded message usually includes an information word IN for the content of the actual message and a control word ST for control of the data transmission. According to FIG. 1, the encoded message CN includes a total of M positions, from position m=1 to position m=M. Of those, the information word has I positions, from position i=1 to position i=I, and the control word ST has S positions, from position s=1 to position s=S. The first and the last position m=1 and m=M of the encoded message CN associated with the control word ST are occupied by a start symbol, e.g. zero, and a stop symbol, e.g. one, respectively. In the serial asynchronous transmission mode, an encoded message CN which has been compiled in this manner by the device is decoded, in the receiver device, in the following manner: in the transmitted data stream, a negative flank (edge) from one to zero, just from the stop symbol to the start symbol, is recognized and interpreted as the start of a new information word IN. Following the start symbol 0, there is a predetermined number I of positions for the information word IN, which are stored and decoded. Thereupon, the stop symbol "one" is awaited. When the stop symbol is recognized, then an attempt is again made to recognize the start symbol "zero" which characterizes the start of another information word IN.

Figure 2:
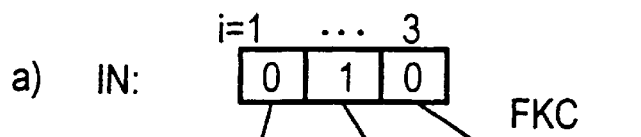

FIG. 2 shows an information word IN, encoded in conventional manner, according to a) and an associated information word IN, encoded according to the invention with an error-correction code FKC, according to b). The information word IN according to b) is output by the transmitter of the device to the line. Each symbol to be transmitted of one of the three positions i=1 to 3 of the information word according to a) is imaged, after application of the error-correction code FKC, by three positions. The process for decoding a thus encoded information word IN according to b) has been discussed in the introduction to the description (majority decision, etc.). It is understood that it is also possible for any other error-correction code to be used.

Preferably, in the interests of a transmission and evaluation which saves as much time as possible, only the information word IN of an encoded message CN according to a) is imaged by the application of an error-correction code onto an information word IN to be transmitted, by way of example according to b). With regard to the interference immunity of the entire system, an error-correction code can also be applied to the symbols of the control word of the encoded message CN.

Figure 5:
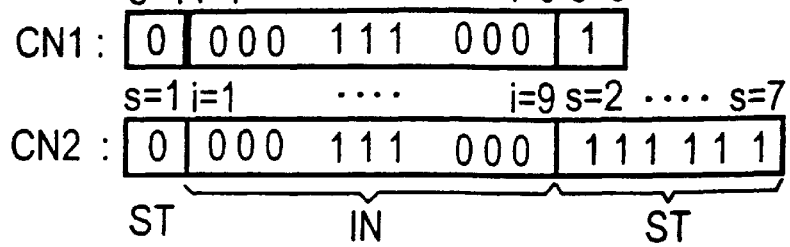

The information word IN according to b) of FIG. 2, which is formed after application of an error-correction code FKC, from the information word IN according to a), together with the associated control word ST having a start symbol zero at the position s=1 and a stop symbol one at the position s=2, is shown in FIG. 5 as an encoded message CN1. According to FIG. 5, the associated control word ST can, however, also be configured in such a manner that a plurality of positions s=2 to s=7 for stop symbols are provided; see encoded message CN2.

Figure 3:
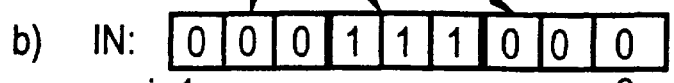

According to FIG. 3, two information words IN1 and IN2 are shown in a), with an illustrative binary symbol occupation. In this case, each information word has six positions i=1 to i=6. The information word IN1 includes a message to trigger the associated occupant protection system. The information word IN2 includes, as a message, a status signal of the processor of the device, which, in its priority, is of lower rank than the message "trigger". According to the invention, the two messages are not encoded, in accordance with a), with the same number of positions, but according to b) with a different number of positions. In this case, the higher-priority message is represented by an information word IN1 having by way of example only two positions i=1 and i=2, and the lower-priority message by an information word IN2 having seven positions i=1 to i=7. In this case, an occupation of the first two positions i=1 and i=2 of the transmitted information word with a one identifies that the following five positions are also associated with the information word and need to be taken into consideration in the evaluation. All other symbol combinations for the first two positions of the information word reveal to the receiving device that no further positions in the data stream are to be ascribed to the information word IN.

Figure 4:
Figure 4:
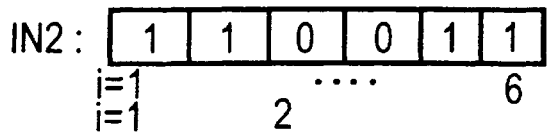
Figure 4:
Figure 4:
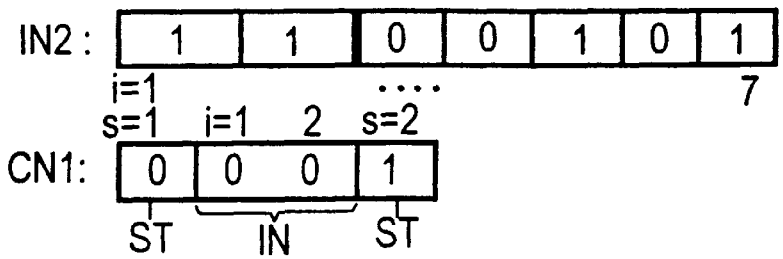

FIG. 4 shows the encoded messages CN1 and CN2 which are associated with the information words IN1 and IN2 according to b) of FIG. 3 and which, besides the information words IN, contain the control words ST.

According to FIG. 6, the inventive proposals to reduce triggering times and to increase the interference immunity are associated with one another in an extremely advantageous manner. By way of example, two encoded messages CN1 and CN2 are shown. In this case, the encoded message CN1 contains a message classified as being of higher priority, in particular an acceleration-dependent, trigger-influencing message, and the encoded message CN2 contains a message classified as being of lower priority, e.g. a status report or an error code. In this case, the encoded message CN1 has a six-position information word IN, which is loaded with an error-correction code and was derived from an originally two-position information word with the symbols "00". The control word ST has a total of 10 positions. Of these, the positions s=1 and s=2 of the control word ST, which precede the information word IN are intended for the start symbol (zero). The control positions s=3 to s=10 which follow the information word IN are in each instance occupied by a one. In this case, the position s=3 is configured as a so-called reserve position and the positions s=4 to s=10 are provided for the stop symbol (one). If only a single start symbol for each encoded message is provided, then in the case of a defectively transmitted start symbol the receiving device usually interprets a symbol of the information word IN as the start symbol. A defective synchronization of the transmitter with the receiver is the consequence. As a result of this, it is advantageous to provide at least one further start symbol/start position ahead of the information word IN of each encoded message CN, so that in the event of a defectively transmitted first start symbol at the position s=1 and a correctly transmitted second start symbol at the position s=2, it is possible to initiate an evaluation, displaced merely by one position, of the information word. If only the symbol at the position s=2 is recognized as start symbol, then the positions i=2 to i=6 and the reserve position s=3 are interpreted as information word IN in place of the position i=1 to i=6. In this case, as a consequence of the error-correction code, for example, the positions i=1 to i=3 are occupied by identical symbols and the positions i=4 to i=6 by identical symbols. In the worst case with the information word IN erroneously interpreted by one position, the position i=4 is not equal to the position i=3 and the position s=3 is not equal to the position i=6. Thus, both the first three positions i=2 to i=4 of the erroneously interpreted information word IN and also the second three positions i=5, i=6 and s=3 of the information word IN exhibit an error, which, if the transmission is in other respects error-free, is however recognized by the evaluation device and corrected. Even if the first start signal of an encoded message is not recognized, on this basis the probability of a correct interpretation of the message by the receiving device is nevertheless guaranteed. If the first start position s=1 is not recognized and the second start position s=2 is recognized, the position of the control word ST which is designated as reserve position s=3 is associated with the information word IN and is in the first instance capable of unrestricted occupation by the inventive device. Preferably, this reference position is occupied by the symbol which also occupies those positions of the information word with which the reference position is read together as a unit if the first start symbol is not recognized, i.e. in the example according to FIG. 6 after the occupation of the position i=5 and i=6. In this way, an error correction possibility for the start symbol is made available through an indirect route.

The control positions s=4 to s=10 represent stop symbols, the redundancy of which is just as expedient as the redundancy of the start positions.

As compared with the encoded message CN1, the encoded message CN2 in FIG. 6 has lower priority and thus has a greater total number of positions M of the encoded message CN and a larger number of positions I of the information word IN than the encoded message word CN1 (M(CN2)=24>M(CN1)=16; I(CN1)=6<I(CN2)=12). In contrast to the information word IN of the coded message CN1, the information word IN of the encoded message CN2 is occupied with a symbol combination ("000111" with error correction or "01" without error correction), which supplies to the receiving device an indication that further positions of the encoded message CN2 are to be ascribed to the information word IN. These further positions i=7 to i=12 contain the actual information of the encoded message CN2. In this case, these positions may be loaded with an error-correction code, but do not need to be so loaded. According to the example in FIG. 6, the inventive device would be able to generate three curtailed encoded messages according to the encoded message CN1 which are classified as being of higher priority. If the second portion of the information word IN with the positions i=7 to i=12 is encoded in error-correction code, then four low priority messages may be represented using these six positions. If error-correction code is not desired, then messages classified as being of low priority can be represented with $2^6$, assuming in each instance binary encoding.

With the above versions, the number of positions and the number of redundant positions (error correction) of an encoded message are optimized with respect to a rapid data transmission of messages classified as being of higher priority, with high interference immunity at the same time.

The encoded message CN2 classified as being of lower priority also includes two start positions. Accordingly, the position s=3 of the control word which follows the first portion i=1 to i=6 of the information word IN is to be considered as the above-mentioned reserve position. The control position s=4 contains a stop symbol. In this case, the position s=5 and s=6 are again provided on a redundant basis for the start symbol zero. The control position s=7 which follows the second portion i=7 to i=12 of the information word IN is provided as a further reserve position for the further portion of the information word i=7 to i=12, before the control positions s=8 to s=12 represent stop bits for the entire encoded message CN2.

To increase the interference immunity of the data transmission, it may be provided that, in spite of the use of error-correction code, encoded messages are repeatedly sent out, in order to be able to detect dual or multiple errors occurring even with a low probability. Furthermore, it may be provided that within an encoded message, i.e. in particular between the start symbol and the stop symbol, the information word containing the actual information is sent on a redundant basis. The first information word is then compared with the second information word of an encoded message in the receiving device and, in the event of divergence, the transmitted message is discarded. The redundant information word transmission can in particular be provided advantageously in the case of messages classified as being of higher priority; that is to say, messages which, for example by reason of their short word length, require only a short transmission time.

The invention has indeed been presented for use with binary codes, but is applied in analogous fashion in the case of multi-stage codes. The invention permits an extremely variable construction of its hardware and software, and also of the resources of the receiving device.

We claim:

1. In a motor vehicle occupant protection system, an apparatus for controlling a motor vehicle occupant protection device, the apparatus comprising:
    a control unit having:
        lateral acceleration sensor for recording lateral acceleration of a motor vehicle and outputting lateral acceleration signal messages;
        an encoder for encoding the messages; and
        a transmitter connected to said encoder for transmitting encoded messages as output signals, the encoded messages including a first encoded message having a first number of positions and containing information relevant to safety and a second encoded message having a second number of positions greater than the first number of positions; and
    an evaluation device centrally positioned in the motor vehicle and having a receiver for receiving the output signals and a decoder connected to said receiver for decoding the output signals back into the messages.

2. The device according to claim 1, wherein said encoded messages include two identical information words.

3. The device according to claim 1, wherein said first encoded message is encoded with an error-correction code, and said second encoded message is encoded in part with and in part without said error-correction code.

4. The device according to claim 1, wherein said first encoded message contains information having a higher priority classification, and said second encoded message containing information having a lower priority classification.

5. The device as claimed in claim 4, wherein said first encoded message contains information appertaining to an indirect or direct triggering of an occupant protection system, and said second encoded message containing device condition information.

6. In a motor vehicle occupant protection system, an apparatus for controlling a motor vehicle occupant protection device, the apparatus comprising:
    a control unit having:
        a lateral acceleration sensor for recording lateral acceleration of a motor vehicle and outputting lateral acceleration signal messages;
        an encoder for encoding the messages; and
        a transmitter connected to said encoder for transmitting encoded messages as output signals, the encoded messages including a first encoded message containing information relevant to safety and a second encoded message, each of the encoded messages having an information word and a control word, the information word of the first encoded message having a first number of positions and the information word of the second encoded message having a second number of positions greater than the first number of positions; and
    an evaluation device centrally positioned in the motor vehicle and having a receiver for receiving the output signals and a decoder connected to said receiver for decoding the output signals back into the messages.

7. The device according to claim 6, wherein said encoded messages include two identical information words.

8. The device according to claim 6, wherein said control word has at least two positions provided for a start symbol, said start symbol indicating a commencement of said information word.

9. The device according to claim 8, wherein said control word has at least one reserve position to be occupied by a symbol and ascribed to said information word.

10. The device according to claim 8, wherein said control word has at least two further positions provided for a stop symbol, said stop symbol indicating an end of said information word.

11. In a motor vehicle occupant protection system, an apparatus for controlling a motor vehicle occupant protection device, the apparatus comprising:
    a control unit having:
        a lateral acceleration sensor for recording lateral acceleration of a motor vehicle and outputting lateral acceleration signal messages; and
        an encoder for encoding the messages containing information relevant to safety;

a transmitter connected to said encoder for transmitting encoded messages as output signals, the encoded messages encoded with an error-correction code; and an evaluation device centrally positioned in the motor vehicle and having a receiver for receiving the output signals and a decoder connected to said receiver for decoding the output signals back into the messages.

12. The device according to claim 11, wherein said encoded messages include two identical information words.

13. The device according to claim 11, wherein at least one of said messages is encoded as an information word with a first number of positions loaded with said error-correction code and a second number of positions loaded without said error-correction code.

14. A configuration for controlling a motor vehicle occupant protection system, comprising:

control unit including:
   a lateral acceleration sensor for recording lateral acceleration of a motor vehicle and outputting lateral acceleration signals;
   an encoder receiving the acceleration signals for encoding messages;
   a transmitter connected to said encoder for transmitting encoded messages as output signals, the encoded messages including acceleration-dependent signals; and an evaluation device centrally positioned in the motor vehicle and disposed spatially separated from said control unit for controlling an occupant protection system, said evaluation device having a receiver for receiving the output signals and a decoder connected to said receiver for decoding the output signals back into the messages, said evaluation device receiving and evaluating the acceleration-dependent signals from said control unit and outputting a trigger signal in dependence on the acceleration-dependent signals.

15. The configuration according to claim 14, including an ignition device disposed spatially separated from said control unit and connected to an ignition element of the occupant protection system, said ignition device receiving said trigger signal for triggering the ignition element.

* * * * *